United States Patent [19]
Cohen

[11] 3,840,732
[45] Oct. 8, 1974

[54] REFLECTIVE LIGHT BOX
[76] Inventor: Arnold Cohen, 408 W. 15th St., New York, N.Y. 10011
[22] Filed: Nov. 12, 1973
[21] Appl. No.: 415,145

[52] U.S. Cl. ............... 240/10 R, 240/4.1, 240/47, 240/109, D48/16 A
[51] Int. Cl. ............................................ G09f 13/08
[58] Field of Search..... 240/4, 4.1, 10 R, 47, 108 R, 240/109; 40/132 R; D48/16 A

[56] References Cited
UNITED STATES PATENTS
| | | | |
|---|---|---|---|
| 928,340 | 7/1909 | Steffin | 240/109 |
| 3,611,603 | 10/1971 | Gesner | 240/10 R |
| 3,622,777 | 11/1971 | Bovio | 240/47 |

OTHER PUBLICATIONS
Edmund Catalog 715, "Converta Light Box," p. 60, issued May 1971.

Primary Examiner—Samuel S. Matthews
Assistant Examiner—Russell E. Adams, Jr.

[57] ABSTRACT

A reflective light box comprising structural support members forming the side walls and back of a light box, light means contained within said light box and a display face comprising the front side of said light box, said display face being formed of a plurality of shaped, translucent members and shaped reflective members. In this manner the reflective light box functions to illuminate a desired area and as a mirror while simultaneously providing an object of high aesthetic appeal. Most preferably the shaped, translucent members are stained glass comprising about 25 to 75% of the area of said display face and the shaped, reflective members are silvered mirror glass comprising about 25 to 80% of said display face.

6 Claims, 1 Drawing Figure

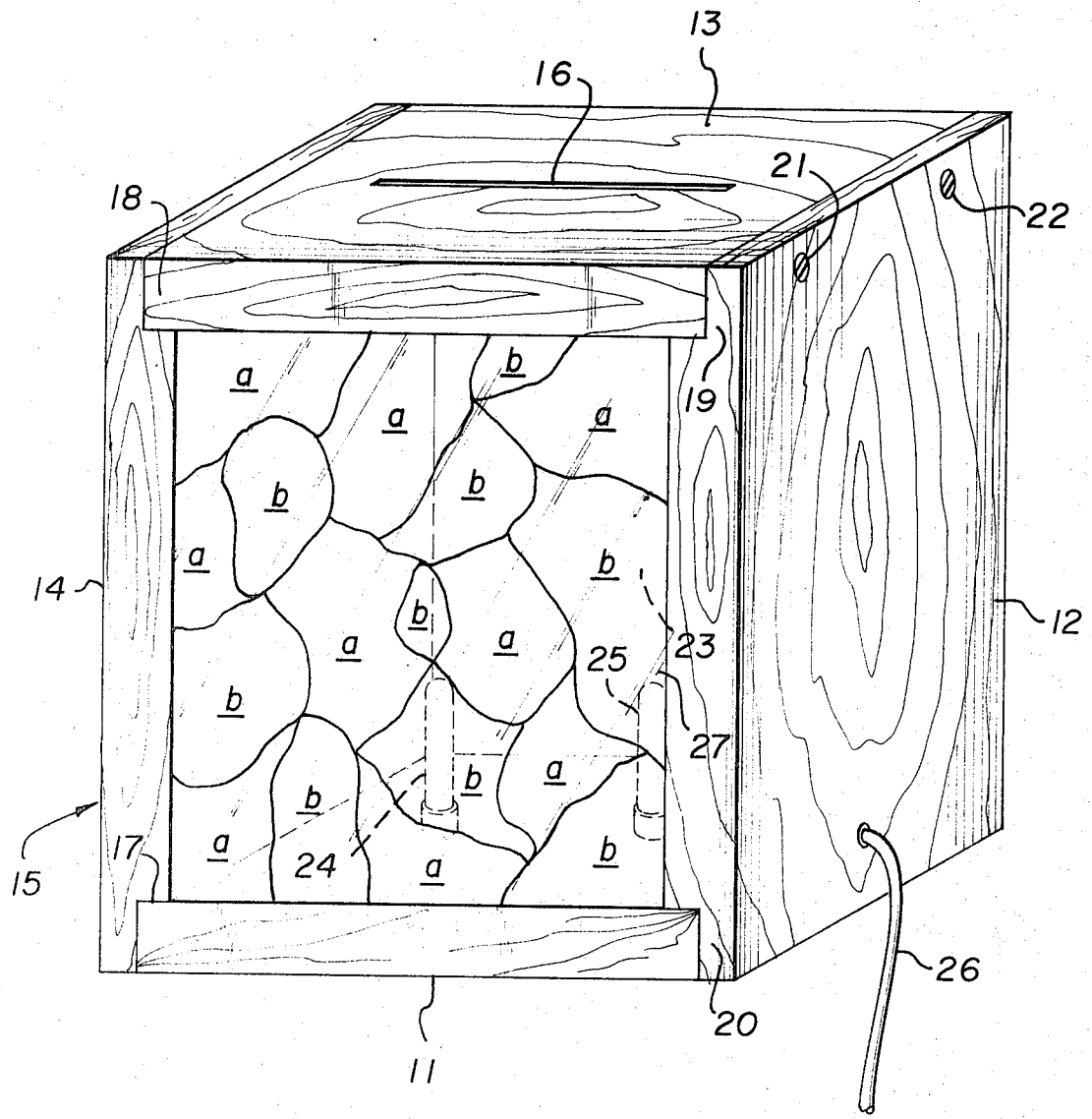

REFLECTIVE LIGHT BOX

DESCRIPTION OF THE INVENTION

The present invention relates to a reflective light box of novel construction. The subject light box can have an aesthetically pleasing appearance so it can be placed in a place of display such as on a wall in a home, office, building lobby, restaurant, etc., while simultaneously serving utilitarian needs as a source of illumination and as a mirror.

A number of structural support members form the side walls and back of the light box. It is possible to construct the light box in any desired shape and size. Thus the light box can have a regular or geometrical shape such as a triangle, square, rectangle, circle, pentagon, hexagon, ellipse and the like. The number of structural support members needed for the side walls will vary of course depending on the geometrical shape employed. Thus, for example, a single support member will serve to form the side wall of a circular light box, four support members are needed for a square or a rectangle, six support memebers form hexagonal side walls and the like. Alternatively, the light box of the instant invention can have an irregular or free form shape utilizing whatever number of support members needed to form the side walls of the selected shape. In all cases a single support member of appropriate size and shape will be utilized to form the back wall.

The material out of which the aforesaid support members are constructed is not narrowly critical. Any suitable material having reasonable structural strength can be employed. Examples of suitable materials include wood, plastics such as polyethylene, polypropylene, polyurethane, polyacrylics and the like, metals such as aluminum, stainless steel, chrome, bronze and the like or any other material conventionally employed in the fabrication of furniture or auxilliary items.

The support members may be joined together in any conventional manner such as by the use of nails, screws, staples, adhesives, tapes, straps and the like.

Shaped, translucent members are utilized to form 20 to 75% of the area of the display face. It is possible to vary the illumination given off by the light box by selecting the degree of translucency of the translucent members to reflective members. In the preferred embodiment of the invention, the shaped translucent members are stained glass pieces of irregular shape such as the constituents of a mosaic. The degree of translucency of such pieces can be adjusted by selection of color shade. Obviously, the deeper shades of color will have less translucency and will allow less illumination to pass through. Alternatively, use of lighter shades will increase translucency and thus increase resultant illumination.

Alternate materials which can be employed as the translucent members include plastic pieces, paper or thin parchment or any other similar material which passes light, can be dyed or colored for decorative purposes and also which is reasonably stable to heat given off by incandescent lamps.

The remaining main portion of the display face is made up of reflective members comprising from about 25 to 80 percent of the area of the display face. These reflective members can be constructed from a highly polished metal piece such as copper, silver, gold and the like, or mirror glass with the reflective side facing outward. The preferred embodiment consists of mirror glass irregularly shaped in mosaic fashion.

The numerous shaped translucent members and the shaped reflective members may be held together to form the display face by any of the techniques conventionally used in the stained glass window art. A particularly preferred method involves placing a thin copper strip around each member comprising the display face and then fixing the various pieces by using lead solder. Spaces between pieces can be filled by adding extra solder. The formed display face is inserted into the light box by providing perimeter grooves within the side, top and bottom walls in a manner well known in the art.

The arrangement of the various members is not narrowly critical within the display face. It is thus possible tp produce aesthetically pleasing designs, pictures or shaped mirror surfaces resembling stained glass window or mosaic like effects. Obviously if one desires to emphasize the mirror functionality then one would employ the higher range of reflective members and would employ such members in substantially adjacent position.

Illumination is provided by light means mounted in the interior of the light box. Suitable light means include one or more incandescent bulbs, fluorescent lamps or the like. The number, shape or strength of the light sources used is not critical and will depend on the balance between functional illumination and decorative appearance desired by the user. It is preferable to use shaped incandescent light bulbs of the tubular type in a sufficient number to provide even lighting over the entire area of the display face containing the translucent members.

The light box of the present invention is more clearly understood by reference to the drawing. Structural support members 11, 12, 13 and 14 are joined edge to edge to form the side, top and bottom walls of light box 15. In a preferred embodiment these support members are wood pieces preferably stained or painted for decorative purposes. Structural support member 13 forms the top wall and desirably will contain a ventillation orifice 16 which most preferably will be formed by making a 45° cut through the member. In this manner any excess heat generated by the lighting means within the light box can be readily vented but without any unsightly light beam being emitted as the light rays will not be able to pass out through the angular cut.

For ease of construction and to enhance stability of the resultant box, the edges of the side walls can be notched such as shown at 17, 18, 19 and 20 in the drawing. The structural support members are held together by conventional means such as by screws shown at 21 and 22 for example.

A fifth structural support member 23 is provided to form the back of the light box Light means in the form of incandescent light bulbs 24 and 25 are contained in the interior of the light box and are connected in conventional manner by means of line cord 26 and appropriate conductive wire (not shown) to a source of electricity.

The display face 27 is made up of a mosaic of a plurality of translucent members (1) and reflective members (b). The spaces between each of the members of the display face is filled with lead solder which serves to hold the display face together. Obviously, it is within the skill of the art to modify the shape, size, number and relative positions of the translucent members and reflective members without departing from the spirit of the present invention. In the preferred embodiment shown translucent members (a) are stained glass pieces while reflective members (b) are silvered mirror glass.

I claim:

1. A reflective light box comprising in combination:

A. structural support members forming the side and back walls of the light box;
    B. light means contained within said light box;
    C. a display face forming the front wall of the light box and comprising a plurality of shaped, translucent members and a plurality of shaped, reflective members, said reflective members being so arranged and constructed as to outwardly reflect external images.

2. The light box of claim 1 wherein said shaped, translucent members make up about 20 to 75 percent of the area of said display face and said shaped, reflective members make up about 25 to 80 percent of said display face area.

3. The light box of claim 1 wherein said translucent members are stained glass and said reflective members are silvered mirror glass.

4. The light box of claim 1 wherein said translucent and said reflective members are held together in said display face by lead solder.

5. The light box of claim 1 wherein said light means is one or more incadescent light bulbs.

6. The light box of claim 1 wherein ventillation is provided by introducing a 45° slit in the structural support member forming the top of said light box.

* * * * *